United States Patent
Helber et al.

(10) Patent No.: US 6,881,840 B2
(45) Date of Patent: Apr. 19, 2005

(54) BENZOTHIAZINE DYES FOR IMAGING ELEMENTS

(75) Inventors: Margaret J. Helber, Rochester, NY (US); Douglas M. Willis, Rochester, NY (US); John DiCillo, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 85 days.

(21) Appl. No.: 10/071,314

(22) Filed: Feb. 8, 2002

(65) Prior Publication Data

US 2003/0192138 A1 Oct. 16, 2003

(51) Int. Cl.⁷ .................. C07D 279/02; C09B 67/28
(52) U.S. Cl. ................ 544/3; 544/49; 430/522; 430/507
(58) Field of Search ............ 544/3, 49; 430/522, 430/507

(56) References Cited

U.S. PATENT DOCUMENTS

| | | | |
|---|---|---|---|
| 3,303,191 A | 2/1967 | Loev | |
| 3,923,709 A | 12/1975 | Worley | |
| 4,256,819 A | 3/1981 | Webster et al. | |
| 4,855,221 A | 8/1989 | Factor et al. | |
| 4,857,446 A | 8/1989 | Diehl et al. | |
| 4,861,700 A | 8/1989 | Shuttleworth et al. | |
| 4,900,653 A | 2/1990 | Factor et al. | |
| 4,923,788 A | 5/1990 | Shuttleworth et al. | |
| 4,940,654 A | 7/1990 | Diehl et al. | |
| 4,948,717 A | 8/1990 | Diehl et al. | |
| 4,948,718 A | 8/1990 | Factor et al. | |
| 4,950,586 A | 8/1990 | Diehl et al. | |
| 4,960,870 A | 10/1990 | Lehmann | |
| 6,057,329 A | * 5/2000 | Davis et al. | 544/249 |

FOREIGN PATENT DOCUMENTS

| | | |
|---|---|---|
| JP | 59-197051 | 8/1984 |
| JP | 61-219951 | 9/1986 |
| WO | WO 92/05164 | 4/1992 |

OTHER PUBLICATIONS

Derwent Abstract DE 2912455 A, Oct. 9, 1980.
Derwent Abstract JP 3213847 A, Sep. 19, 1991.
Derwent Abstract JP 3220551 A, Sep. 27, 1991.
Lombardino et al, Organic Preparations and Procedures Int., 1971, 3(1), pp. 33–6.
U.S. Ser. No. 10/071,287 filed Feb. 8, 2002 by Helber et al, "Imaging Materials Containing Novel Benxothiazine Dyes".
F.T. Coppo et al., "Novel Heterocycles," J. of Heterocyclic Chemistry, ol 35, No. 4, 1998, pp. 983–987.
Chemical Abstract, vol. 132 No. 12, Mar. 20, 2000.
JP Abstract 59 197051.
JP Abstract 61 219951.

* cited by examiner

Primary Examiner—Venkataraman Balasubramanian
(74) Attorney, Agent, or Firm—Sarah Meeks Roberts

(57) ABSTRACT

This relates to a dye represented by Formulae II and IIA below:

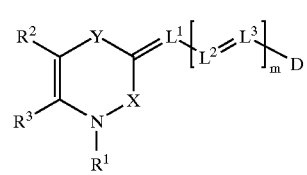

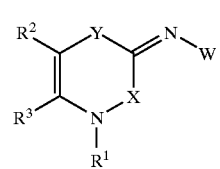

wherein;

$R^1$ represents a hydrogen, an aryl group containing 6 to 14 carbon atoms, or an alkyl group containing 1 to 12 carbon atoms, $R^2$ and $R^3$ together form an aromatic, carbocyclic or heterocyclic ring system containing 6 to 14 atoms;

X represents a sulfoxide (S=O), sulfone ($SO_2$), or dicyanovinyl ($C(CN)_2$) group;

Y represents a sulfoxide (S=O), sulfone ($SO_2$), carbonyl (C=O) or dicyanovinyl ($C(CN)_2$) group;

$L^1$, $L^2$, and $L^3$ represent methine groups, wherein the methine groups may combine to form a 5- or 6-membered ring when m is equal to or >1;

m is 0, 1, 2, or 3;

W is an aryl group; and

D is a moiety in conjugation with the X and Y groups.

12 Claims, No Drawings

BENZOTHIAZINE DYES FOR IMAGING ELEMENTS

FIELD OF THE INVENTION

This invention relates to dyes and, more particularly, to novel benzothiazine dyes that are useful in imaging materials including photographic materials.

BACKGROUND OF THE INVENTION

Although the variety of dyes and pigments known in the art is very wide, there is a continuing effort by synthetic dye chemists to discover new chromophoric systems for use as colorants in a broad range of applications. These applications include: textile dyes, hair dyes, paint pigments, printing inks, inkjet colorants, rubber and plastic colorants, polymer stabilizers, electrochromic and thermochromic display devices, laser dyes, electrophotographic pigments, sensitizing dyes, image dyes, and filter dyes for photographic systems, liquid crystal display devices, optical disks, biological stains, and others.

A wide variety of dyes are employed in photographic materials. In addition to the diverse dyes used to form images in color photographic elements, spectral sensitizing dyes are used to extend the sensitivity of silver halides, which are inherently sensitive only to blue light, to other wavelengths of radiation. Among the dyes commonly employed for this purpose are the cyanines and merocyanines, which are discussed in T. H. James, ed., *The Theory of the Photographic Process*, 4th Ed., Macmillan, N.Y., 1977, Chapter 8, and in F. M. Hamer, Cyanine Dyes and Related Compounds, Wiley, N.Y., 1964.

Photographic materials often contain filter dyes to absorb light from different regions of the spectrum, such as red, blue, green, ultraviolet, and infrared, to name a few. These filter dyes are often required to perform the function of absorbing light during exposure of the material so as to prevent or at least inhibit light of a specific spectral region from reaching at least one of the radiation sensitive layers of the element. Dyes are also used in color photographic materials as filters, typically located in overcoats or interlayers, to absorb incident radiation and improve image sharpness. It is a particular problem that many polymethine dyes used as intergrain absorbers in photographic films are fluorescent, and upon absorbing light at their absorbance maxima can in turn emit light in the form of fluorescence, generally at a wavelength longer than that of their absorbance maxima. Fluorescence by absorber dyes can result in false sensitization of sensitized emulsions, rendering some classes of dyes unfit for use in photographic materials.

In addition, dyes are often used in non-imaging layers as antihalation dyes which absorb the radiation that passes through the imaging layers unabsorbed, and hence prevent undesirable blurriness of the final image. After processing of the element, however, the continued presence of the antihalation dye will adversely affect the image quality of the photographic material. It is therefore desirable to use antihalation dyes that will be solubilized and removed or at least decolorized during photographic processing. Dyes that are easily solubilized, however, tend to wander throughout the photographic material during coating, adversely affecting the final image quality. To prevent dye wandering, the dyes can be coated with a mordant to bind the dye in the layer in which it is coated. Dye mordants, while often useful, tend to either bind the dye too strongly, inhibiting solubilization of the dye during photographic processing, or too weakly, thus not preventing dye wandering. To address this problem, dyes used as antihalation dyes or filter dyes may be formulated a solid particle dispersions. Solid particle dispersions allow for the coating of filter dyes in a layer-specific manner such that the dyes are immobile in coated acidic emulsion layers, but then are fully removed in the high pH environment of photographic processes. Solid particle dispersions of highly stable dyes also offer advantages for use in output media such as inkjet printing.

There are numerous patents describing various filter dyes formulated as water-soluble absorber dyes or as solid particle dispersion dyes, for example, U.S. Pat. Nos. 4,950,586; 4,948,718; 4,948,717; 4,940,654; 4,923,788; 4,900,653; 4,861,700; 4,857,446; and 4,855,221. Further, some nuclei represented generally by Formula I below (X=SO$_2$, C=O; Y=S$_2$, C=O) are known; specifically the benzothiazine compounds described by Formula IA below are described in (Lombardino et. al.; *Org. Prep. Proc. Int.* 1971, 3(1), 33) and (U.S. Pat. No. 3,303,191). Tautomeric derivatives

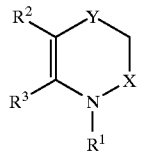

I

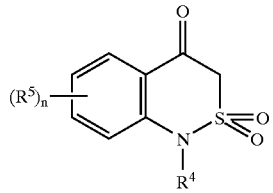

IA substituted at the ketomethylene position by various ester groups are also described for pharmaceutical applications (JP 46022150). However, none of these references describe any polymethine or azamethine dyes derived specifically from the benzothiazine nuclei utilized in the current invention, or other closely related nuclei, or their use in imaging elements.

Regardless of the large number of known dyes, there is still a need in the imaging arts for filter dyes which do not fluoresce and which can be used as absorber dyes or antihaltion dyes.

SUMMARY OF THE INVENTION

The invention provides dyes represented by Formulae II and IIA below:

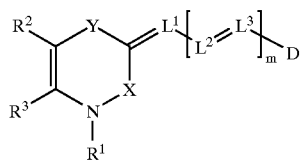

II

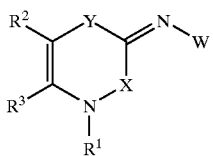

IIA

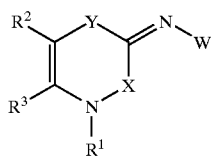

IIA

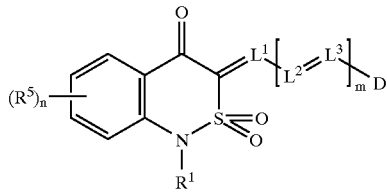

III

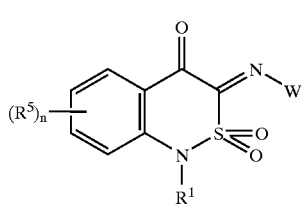

IIIA wherein;

R¹ represents a hydrogen, an aryl group containing 6 to 14 carbon atoms, or an alkyl group containing 1 to 12 carbon atoms;

R² and R³ together form an aromatic, carbocyclic or heterocyclic ring system containing 6 to 14 atoms;

X represents a sulfoxide (S=O), sulfone ($SO_2$), or dicyanovinyl ($C(CN)_2$) group;

Y represents a sulfoxide (S=O), sulfone ($SO_2$), carbonyl (C=O) or dicyanovinyl ($C(CN)_2$) group;

$L^1$, $L^2$, and $L^3$ represent methine groups, wherein the methine groups may combine to form a 5- or 6-membered ring when m is equal to or >1 m is 0, 1, 2, or 3,

W is an aryl group; and

D is a moiety in conjugation with the X and Y groups.

The dyes of this invention can be conveniently synthesized and are useful dyes in imaging elements, including silver halide photographic materials and inkjet materials. Further, the dyes of the invention do not cause undesirable fluorescence.

DETAILED DESCRIPTION OF THE INVENTION

It have been found that a wide variety of nuclei described by Formula I, and most preferably 3,4-dihydro-1H-2,1-benzothiazin-4-one 2,2-dioxide nuclei (hereupon commonly referred to as "benzothiazine") compounds as described by Formula IA can be used to conveniently prepare dyes of Formulae II and IIA, and most preferably dyes of Formulae III and IIIA below:

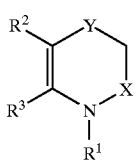

I

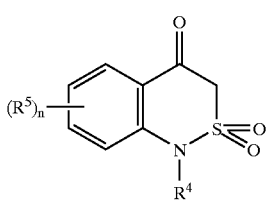

IA

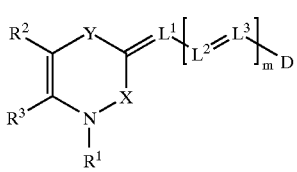

II

Formulae I, IA, II, IIA, III, and IIIA above, $R^1$ and $R^4$ each independently represents an aryl group containing 6 to 14 carbon atoms, or an alkyl group containing 1 to 12 carbon atoms. $R^2$ and $R^3$ together form an aromatic carbocyclic or heterocyclic ring system containing 6 to 14 atoms (for example, a substituted or unsubstituted benzene ring). X may represent a sulfoxide, sulfone or dicyanovinyl, and Y may represent a sulfoxide, sulfone, carbonyl or dicyanovinyl. In a preferred embodiment, X is a sulfone ($SO_2$) and Y is a carbonyl (C=O). $R^5$ groups each individually represents an alkyl group of 1 to 20 (preferably 1 to 8) carbon atoms, an alkenyl group of 2 to 20 (preferably 2 to 8) carbon atoms, or an aryl, aralkyl, heterocyclic or cycloalkyl group of 5 to 14 carbon atoms, or a hydroxy, alkoxy, carboxy, alkoxycarbonyl, amido, cyano, halogen, nitro or hydrogen. Each L represents a methine group (this including the possibility of any of them being members of a 5- or 6-membered ring where m=1, or particularly when m>1). m is 0, 1, 2, or 3. W represents an aryl group.

Unless otherwise specifically stated, use of the term "substituted" or "substituent" means any group or atom other than hydrogen. Additionally, when the term "group" is used, it means that when a substituent group contains a substitutable hydrogen, it is also intended to encompass not only the substituent's unsubstituted form, but also its form further substituted with any substituent group or groups so long as the substituent does not destroy properties necessary for photographic utility. If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided.

D preferably contains an atom with an available electron pair positioned in conjugation with the X and Y groups in Formula II or in conjugation with the carbonyl oxygen of the benzothiazine ring in Formula III, said atom being an O, N, Se, S or C with at least one electron-withdrawing group bonded thereto, or D may be a group containing a benzene ring. D may particularly contain an O or N atom, or a —C(CN)$_2$ positioned in conjugation with the X and Y groups in Formula II or in conjugation with the carbonyl oxygen of the benzothiazine ring in Formula III. By being positioned in "conjugation" with the carbonyl oxygen, it is meant that there is a conjugated system between the oxygen and the atom in D. Such systems are generally known in organic chemistry and refer to a chain in which a single bond, and a double or triple bond, appear alternately. D is not a hemicyanine moiety. Particular groups for D include:

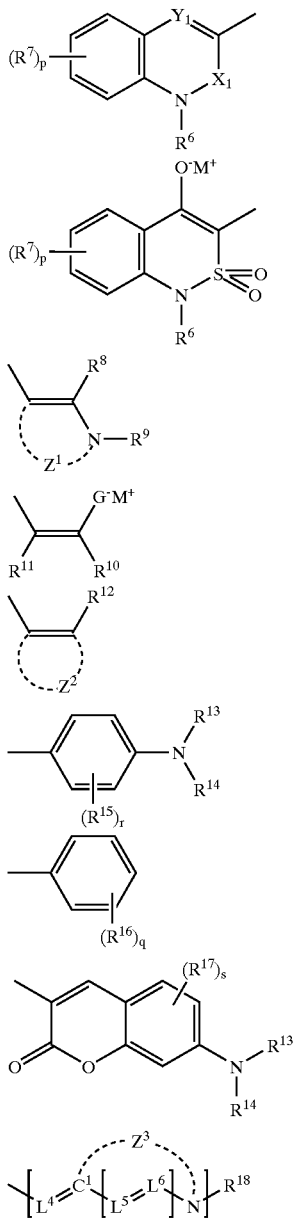

In the above, $X_1$, represents a sulfoxide (S=O), sulfone (SO$_2$), or dicyanovinyl (C(CN)$_2$) group and $Y_1$, represents a sulfoxide (S=O), sulfone (S$_2$), carbonyl (C=O) or dicyanovinyl (C(CN)$_2$) group. $R^6$ represents an aryl group (which includes substituted or unsubstituted) preferably containing 6 to 14 carbon atoms, or an alkyl group containing 1 to 12 carbon atoms. $R^7$ groups each individually represents an alkyl group of 1 to 20 (preferably 1 to 8) carbon atoms, an alkenyl group of 2 to 20 (preferably 2 to 8) carbon atoms, or an aryl, arylalkyl, heterocyclic or cycloalkyl group of 5 to 14 carbon atoms, or a hydroxy, carboxy, cyano, chloro, nitro or hydrogen. $R^8$ represents a hydrogen, carboxy, carboxyalkyl, sulfonamido, sulfamoyl, or an alkyl, arylalkyl, cycloalkyl, alkoxy, alkylamino, or alkylthio group preferably of 1 to 10 carbon atoms. $R^9$ represents an alkyl group preferably of 1 to about 8 carbon atoms, or an arylalkyl or cycloalkyl group preferably of 5 to about 10 carbon atoms. G represents —O or —C(CN)$_2$. Groups of up to 12 carbon atoms may particularly include aryl groups such as phenyl, or cycloalkyl groups such as a substituted or unsubstituted cyclohexyl.

$R^{10}$ represents an alkyl group ("group" wherever used in the present application including the possibility of being substituted or unsubstituted alkyl) of 1 to 20 (preferably 1 to 8) carbon atoms or an alkenyl group of 2 to 20 (preferably of 2 to 8) carbon atoms; or an aryl, aralkyl, heterocyclic or cycloalkyl group preferably of 5 to about 14 carbon atoms. $R^{11}$ represents an electron withdrawing group. In particular, preferred electron withdrawing substituents would have a Hammett $\sigma_p$ constant of greater than 0.1 and preferably between 0.1 and 1.0 (for example, between any of 0.3, 0.4, 0.5 or 0.6 and 1.0). Hammett $\sigma_p$ values are discussed in *Advanced Organic Chemistry* 3rd Ed., J. March, (John Wiley Sons, N.Y.; 1985). Note that the "p" subscript refers to the fact that the σ values are measured with the substituents in the para position of a benzene ring. Additional tables relating to Hammett $\sigma_p$ constants can be found in *Chemical Reviews* Volume 91, pages 165–195 (authored by C Hansch et al.). Groups for $R^{11}$ may include cyano, acyl, benzoyl, phenacyl, aminocarbonyl, alkoxycarbonyl, aryl, or alkylsulfonyl group (any of which particularly may have 2 to 20, and preferably of 2 to 8, carbon atoms), or an arylsulfonyl or any sulfamoyl group (either particularly including those of 1 to 8, and preferably 1 to 20, carbon atoms). Alternatively, $R^{10}$ and $R^{11}$ may together represent the non-metallic atoms necessary to complete a substituted or unsubstituted ring containing at least one 5-or 6-membered heterocyclic or unsaturated alicyclic nucleus.

$R^{12}$, $R^{15}$, $R^{16}$ and $R^{17}$ each individually represents hydrogen, carboxy, carboxyalkyl, sulfonamido, sulfamoyl, or an alkyl, arylalkyl, cycloalkyl, alkoxy, alkylamino, or alkylthio group preferably of 1 to 10 carbon atoms. $R^{13}$ and $R^{14}$ each individually represents an alkyl group preferably of 1 to 20 (and more preferably 1 to 8) carbon atoms or an alkenyl group preferably of 2 to 8 carbon atoms, or an aryl, arylalkyl, heterocyclic or cycloalkyl group preferably of 5 to about 14 carbon atoms. Alternatively, $R^{13}$ and $R^{14}$ together represent the non-metallic atoms required to form a substituted or unsubstituted 5- or 6-membered ring with each other, or $R^{13}$ and $R^{14}$ individually represent the non-metallic atoms necessary to form a substituted or unsubstituted 5- or 6-membered fused ring with the phenyl ring to which the nitrogen is attached. $R^{18}$ represents an alkyl group preferably of 1 to about 8 carbon atoms, or an arylalkyl or cycloalkyl group preferably of 5 to about 10 carbon atoms. G represents —O or —C(CN)$_2$.

$Z^1$, $Z^2$ and $Z^3$ each individually represents the non-metallic atoms necessary to complete a substituted or unsubstituted ring system containing at least one 5- or 6-membered heterocyclic nucleus.

The group formed by $Z^2$ may include pyridine, pyrazole, pyrrole, furan, thiophene, and congeners, or fused ring systems such as indole, benzoxazole, and congeners.

The atoms represented by $Z^3$ can complete a 5- or 6-membered heterocyclic nucleus, which can be fused with additional substituted or unsubstituted rings such as a benzo ring. Suitable heterocyclic nuclei are of the type commonly used in sensitizing dyes and are well known in the art. Many are described, for example, in James, *The Theory of the Photographic Process,* 4th Edition, pages 195–203. Useful heterocyclic nuclei include thiazole, selenazole, oxazole, imidazole, indole, benzothiazole, benzindole, naphthothiazole, naphthoxazole, benzimidazole, and the like. In a preferred embodiment, Z represents the atoms necessary to complete a substituted or unsubstituted benzoxazole or benzothiazole nucleus.

m is 0, 1, 2, or 3. n is 0, 1, 2, 3, or 4. p is 0, 1, 2, 3, or 4. q is 0, 1, 2, 3, 4, or 5. r is 0, 1, 2, 3 or 4. s is 0, 1, 2, or 3. t is 0 or 1.

Active methylene moieties of D4, as represented below, where G

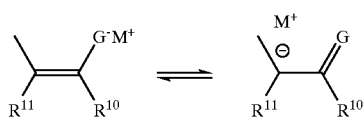

represents O, are well known in the art and are described, for example, in Hamer, *Cyanine Dyes and Related Compounds,* pages 469–494 and 595–604. In accordance with the present invention, preferred active methylene groups include those derived from benzoylacetonitrile, 2-pyrazolin-5one, pyrazolidindione, barbituric acid, rhodanine, indandione, benzofuranone, chromandione, cyclohexanedione, dioxanedione, furanone, isoxazolinone, pyrazolopyridine, pyridone, isoxazolidinedione, pyrandione, and tricyanopropene ($R^{11}$=CN, G=C(CN)$_2$) $M^+$ *is a cation such as $H+$,* $Et_3NH^+$, $C_5H_5NH_+$, $Na^+$, $K^+$, and the like.

$L^1$ through $L^6$ are methine groups (the term "group", as already mentioned, is used in this application to include substituted or unsubstituted). Substituents on $L^1$ through $L^6$ may include a substituted or unsubstituted alkyl, alkenyl, aryl, aralkyl, chloro or acetoxy, or cycloalkyl group, as described above for $R^6$ and $R^7$. Any of $L^1$ through $L^6$ may be members of a carbocyclic or heterocyclic ring (particularly a 5- or 6-membered ring of either type), such as cyclopentyl, cyclohexyl, and congeners. It will be understood that this possibility is within the definition of substituted methines ("substituted" methines being included in the term "group" in reference to methines). For example, when m=1, and particularly when m>1, $L^1$ through $L^3$ (particularly $L^2$ and $L^3$) can be members of any of the foregoing types of rings (and are therefore considered "substituted").

Examples of any of the alkyl groups mentioned above are methyl, ethyl, propyl, isopropyl, butyl, isobutyl, t-butyl, pentyl, hexyl, octyl, 2-ethylhexyl, and congeners. Cycloalkyl groups can be cyclopentyl, cyclohexyl, 4-methylcyclohexyl, and congeners. Alkenyl groups can be vinyl, 1-propenyl, 1-butenyl, 2-butenyl, and congeners. Aryl groups can be phenyl, naphthyl, styryl, and congeners. Arylalkyl groups can be benzyl, phenethyl, and congeners. Useful substituents on any of the foregoing or other groups disclosed, include halogen, alkoxy, acyl, alkoxycarbonyl, aminocarbonyl, carbonamido, carboxy, sulfamoyl, sulfonamido, sulfo, nitro, hydroxy, amino and congeners.

Examples of the dyes of the invention are shown below.

TABLE 1

| Dye | $R^1$ | $R^2$ | $R^3$ | $R^4$ | $R^5$ | $R^6$ | $M^+$ |
|---|---|---|---|---|---|---|---|
| 1-1 | $CH_2Ph$ | H | H | COOH | H | H | H |
| 1-2 | $CH_2Ph$ | H | H | COOH | H | $CH_3$ | H |
| 1-3 | $CH_2Ph$ | H | $NHSO_2Me$ | $CO_2Me$ | H | COPh | H |
| 1-4 | $CH_2Ph$ | H | H | $CO_2Me$ | H | cp$^-$ | H |
| 1-5 | $CH_3$ | H | H | COOH | H | H | H |
| 1-6 | $CH_3$ | H | H | COOH | H | $CH_3$ | H |
| 1-7 | $CH_3$ | H | $NHSO_2Me$ | $CO_2Me$ | H | COPh | H |
| 1-8 | $CH_3$ | H | H | $CO_2Me$ | H | sp$^-$ | H |
| 1-9 | $CH_3$ | H | $NHSO_2Me$ | H | H | H | H |
| 1-10 | $CH_3$ | H | $NHSO_2Me$ | H | H | $CH_3$ | H |
| 1-11 | Et | H | H | COOH | H | H | H |
| 1-12 | Et | H | H | COOH | H | $CH_3$ | H |
| 1-13 | Et | H | $NHSO_2Me$ | $CO_2Me$ | H | COPh | H |
| 1-14 | Et | H | H | $CO_2Me$ | H | sap$^-$ | H |
| 1-15 | sp$^-$ | H | H | H | H | sp$^-$ | H |
| 1-16 | sp$^-$ | H | $NHSO_2Me$ | H | H | $CH_3$ | H |
| 1-17 | sp$^-$ | H | H | COOH | H | H | H |
| 1-18 | sp$^-$ | H | $NHSO_2Me$ | H | H | COPh | H |
| 1-19 | cp$^-$ | H | H | $CO_2Me$ | H | cp$^-$ | H |
| 1-20 | cp$^-$ | H | $NHSO_2Me$ | COOH | H | H | H |
| 1-21 | cp$^-$ | H | H | $CO_2Me$ | H | COPh | H |
| 1-22 | cp$^-$ | H | $NHSO_2Me$ | H | H | $CH_3$ | H |
| 1-23 | sap$^-$ | H | H | COOH | H | H | H |
| 1-24 | sap$^-$ | H | $NHSO_2Me$ | $CO_2Me$ | H | $CH_3$ | H |
| 1-25B | sap$^-$ | H | H | H | H | sap$^-$ | H |
| 1-26 | sap$^-$ | H | $NHSO_2Me$ | H | H | cp$^-$ | H |
| 1-27 | $CH_3$ | H | H | $CO_2Me$ | H | H | $Et_3NH$ |
| 1-28 | $CH_3$ | H | $NH_2$ | H | H | H | $Et_3NH$ |
| 1-29 | $CH_3$ | H | $SO_3$ | H | H | H | K |

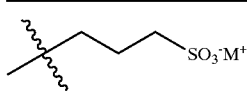

sp$^-$ = sulfopropyl

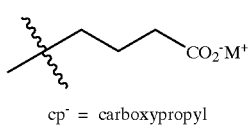

cp$^-$ = carboxypropyl

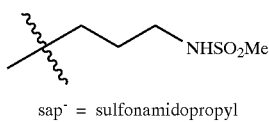

sap$^-$ = sulfonamidopropyl

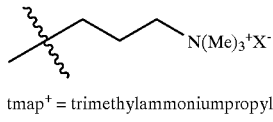

tmap$^+$ = trimethylammoniumpropyl

TABLE 2

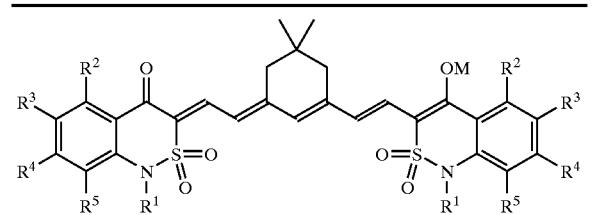

| Dye | R¹ | R² | R³ | R⁴ | R⁵ | M |
|---|---|---|---|---|---|---|
| 2-1 | CH₂Ph | H | H | COOH | H | H |
| 2-2 | CH₂Ph | H | NHSO₂Me | CO₂Me | H | H |
| 2-3 | CH₂Ph | H | H | CO₂Me | H | H |
| 2-4 | CH₂Ph | H | NHSO₂Me | H | H | H |
| 2-5 | CH₃ | H | H | COOH | H | H |
| 2-6 | CH₃ | H | NHSO₂Me | CO₂Me | H | H |
| 2-7 | CH₃ | H | H | CO₂Me | H | H |
| 2-8 | CH₃ | H | NHSO₂Me | H | H | H |
| 2-9 | Et | H | H | COOH | H | H |
| 2-10 | Et | H | NHSO₂Me | CO₂Me | H | H |
| 2-11 | Et | H | H | CO₂Me | H | H |
| 2-12 | Et | H | NHSO₂Me | H | H | H |
| 2-13 | sp⁻ | H | H | H | H | H |
| 2-14 | sp⁻ | H | NHSO₂Me | H | H | H |
| 2-15 | sp⁻ | H | H | COOH | H | H |
| 2-16 | sp⁻ | H | NHSO₂Me | H | H | H |
| 2-17 | cp⁻ | H | H | CO₂Me | H | H |
| 2-18 | cp⁻ | H | NHSO₂Me | COOH | H | H |
| 2-19 | cp⁻ | H | H | CO₂Me | H | H |
| 2-20 | cp⁻ | H | NHSO₂Me | H | H | H |
| 2-21 | sap⁻ | H | H | COOH | H | H |
| 2-22 | sap⁻ | H | NHSO₂Me | CO₂Me | H | H |
| 2-23 | sap⁻ | H | H | H | H | H |
| 2-24 | sap⁻ | H | NHSO₂Me | H | H | H |
| 2-25 | cp⁻ | H | NHSO₂Me | H | H | tmap⁺ |
| 2-26 | sp⁻ | H | H | COOH | H | tmap⁺ |

TABLE 3

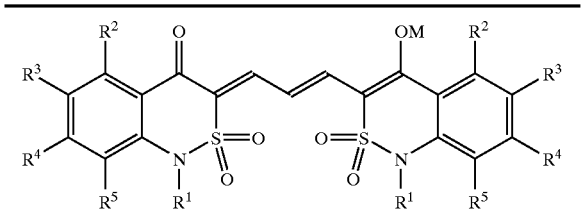

| Dye | R¹ | R² | R³ | R⁴ | R⁵ | M⁺ |
|---|---|---|---|---|---|---|
| 3-1 | CH₂Ph | H | H | COOH | H | H |
| 3-2 | CH₂Ph | H | NHSO₂Me | CO₂Me | H | H |
| 3-3 | CH₂Ph | H | H | H | H | H |
| 3-4 | CH₂Ph | H | NHSO₂Me | H | H | H |
| 3-5 | CH₃ | H | H | COOH | H | H |
| 3-6 | CH₃ | H | NHSO₂Me | CO₂Me | H | H |
| 3-7 | CH₃ | H | H | CO₂Me | H | H |
| 3-8 | CH₃ | H | NHSO₂Me | H | H | H |
| 3-9 | Et | H | H | COOH | H | H |
| 3-10 | Et | H | NHSO₂Me | CO₂Me | H | H |
| 3-11 | CH₃ | H | H | CO₂Me | H | Et₃NH |
| 3-12 | Et | H | NHSO₂Me | H | H | H |
| 3-13 | H | H | SO₂Na | H | H | Na |
| 3-14 | sp⁻ | H | NHSO₂Me | H | H | H |
| 3-15 | sp⁻ | H | H | COOH | H | H |
| 3-16 | sp⁻ | H | NHSO₂Me | H | H | H |
| 3-17 | cp⁻ | H | H | CO₂Me | H | H |
| 3-18 | cp⁻ | H | NHSO₂Me | COOH | H | H |
| 3-19 | cp⁻ | H | H | CO₂Me | H | H |
| 3-20 | cp⁻ | H | NHSO₂Me | H | H | H |
| 3-21 | sap⁻ | H | H | COOH | H | H |
| 3-22 | sap⁻ | H | NHSO₂Me | CO₂Me | H | H |
| 3-23 | sap⁻ | H | H | H | H | H |
| 3-24 | sap⁻ | H | NHSO₂Me | H | H | H |
| 3-25 | cp⁻ | H | NHSO₂Me | H | H | tmap⁺ |
| 3-26 | sp⁻ | H | H | COOH | H | tmap⁺ |
| 3-27 | H | H | H | H | H | H |
| 3-28 | Cp– | H | SO₃ | H | H | Na |

TABLE 4

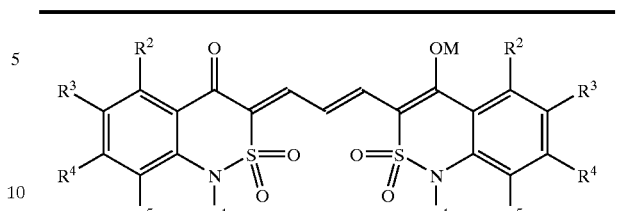

| Dye | R¹ | R² | R³ | R⁴ | R⁵ | M |
|---|---|---|---|---|---|---|
| 4-1 | CH₂Ph | H | H | COOH | H | H |
| 4-2 | CH₂Ph | H | NHSO₂Me | CO₂Me | H | H |
| 4-3 | CH₂Ph | H | H | CO₂Me | H | H |
| 4-4 | CH₂Ph | H | NHSO₂Me | H | H | H |
| 4-5 | CH₃ | H | H | COOH | H | H |
| 4-6 | CH₃ | H | NHSO₂Me | CO₂Me | H | H |
| 4-7 | CH₃ | H | H | CO₂Me | H | H |
| 4-8 | CH₃ | H | NHSO₂Me | H | H | H |
| 4-9 | CH₃ | H | H | CO₂CH₃ | H | Et₃NH |
| 4-10 | Et | H | NHSO₂Me | CO₂Me | H | H |
| 4-11 | Et | H | H | CO₂Me | H | H |
| 4-12 | Et | H | NHSO₂Me | H | H | H |
| 4-13 | sp⁻ | H | H | H | H | H |
| 4-14 | sp⁻ | H | NHSO₂Me | H | H | H |
| 4-15 | sp⁻ | H | H | COOH | H | H |
| 4-16 | sp⁻ | H | NHSO₂Me | H | H | H |
| 4-17 | cp⁻ | H | H | CO₂Me | H | H |
| 4-18 | cp⁻ | H | NHSO₂Me | COOH | H | H |
| 4-19 | cp⁻ | H | H | CO₂Me | H | H |
| 4-20 | cp⁻ | H | NHSO₂Me | H | H | H |
| 4-21 | sap⁻ | H | H | COOH | H | H |
| 4-22 | sap⁻ | H | NHSO₂Me | CO₂Me | H | H |
| 4-23 | sap⁻ | H | H | H | H | H |
| 4-24 | sap⁻ | H | NHSO₂Me | H | H | H |
| 4-25 | cp⁻ | H | NHSO₂Me | H | H | tmap⁺ |
| 4-26 | sp⁻ | H | H | COOH | H | tmap⁺ |

TABLE 5

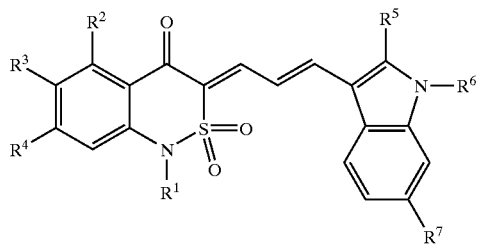

| Dye | R¹ | R² | R³ | R⁴ | R⁵ | R⁶ | R⁷ |
|---|---|---|---|---|---|---|---|
| 5-1 | CH₃ | H | H | COOH | H | H | H |
| 5-2 | CH₃ | H | H | COOH | CH₃ | H | H |
| 5-3 | Et | H | H | COOH | H | H | H |
| 5-4 | Et | H | H | COOH | CH₃ | H | H |
| 5-5 | n-Bu | H | H | COOH | H | H | H |
| 5-6 | n-Bu | H | H | COOH | CH₃ | H | H |
| 5-7 | CH₂Ph | H | H | COOH | H | H | H |
| 5-8 | CH₂Ph | H | H | COOH | CH₃ | H | H |
| 5-9 | CH₃ | H | NHSO₂CH₃ | H | H | H | H |
| 5-10 | CH₃ | H | NHSO₂CH₃ | H | CH₃ | H | NHSO₂CH₃ |
| 5-11 | Et | H | NHSO₂CH₃ | H | CH₃ | H | COOH |
| 5-12 | —(CH₂)₃COOH | H | H | CO₂Me | CH₃ | H | H |
| 5-13 | —(CH₂)₃COOH | H | H | CO₂Me | Ph | H | H |
| 5-14 | —(CH₂)₃COOH | H | H | CO₂Me | CH₃ | —(CH₂)₃COOH | H |
| 5-15 | —(CH₂)₃SO₃K | H | H | H | CH₃ | H | H |
| 5-16 | —(CH₂)₃SO₃K | H | H | CO₂K | CH₃ | H | H |
| 5-17 | —(CH₂)₃SO₃K | H | H | CO₂K | CH₃ | —(CH₂)₃SO₃K | H |
| 5-18 | CH₃ | H | H | H | CH₃ | —(CH₂)₃SO₃Na | H |
| 5-19 | —CH₂)Pb(4-COOH) | H | H | CO₂Me | CH₃ | CH₃ | H |
| 5-20 | CH₃ | H | SO₂Na | H | CH₃ | H | H |

TABLE 6

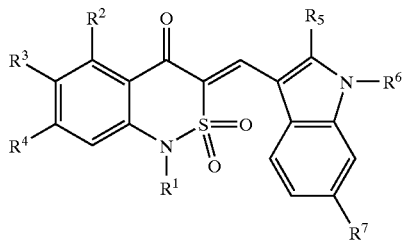

| Dye | R¹ | R² | R³ | R⁴ | R⁵ | R⁶ | R⁷ |
|---|---|---|---|---|---|---|---|
| 6-1 | CH₃ | H | H | COOH | H | H | H |
| 6-2 | CH₃ | H | H | COOH | CH₃ | H | H |
| 6-3 | Et | H | H | COOH | H | H | H |
| 6-4 | Et | H | H | COOH | CH₃ | H | H |
| 6-5 | n-Bu | H | H | COOH | H | H | CO₂Me |
| 6-6 | n-Bu | H | H | COOH | CH₃ | H | H |
| 6-7 | CH₂Ph | H | H | COOH | H | H | H |
| 6-8 | CH₂Ph | Cl | H | COOH | CH₃ | H | H |
| 6-9 | CH₃ | H | NHSO₂CH₃ | H | H | H | H |
| 6-10 | CH₃ | H | NHSO₂CH₃ | H | CH₃ | H | NHSO₂CH₃ |
| 6-11 | CH₃ | H | H | H | CH₃ | H | COOH |
| 6-12 | —(CH₂)₃COOH | H | H | CO₂Me | CH₃ | H | H |
| 6-13 | —(CH₂)₃COOH | H | H | CO₂Me | Ph | H | H |
| 6-14 | —(CH₂)₃COOH | H | H | CO₂Me | CH₃ | —(CH₂)₃COOH | H |
| 6-15 | —(CH₂)₃SO₃K | OH | H | H | CH₃ | H | H |
| 6-16 | —(CH₂)₃SO₃K | H | H | CO₂K | CH₃ | H | H |
| 6-17 | —(CH₂)₃SO₃K | H | H | CO₂K | CH₃ | —(CH₂)₃SO₃K | H |
| 6-18 | CH₃ | H | H | CO₂Me | CH₃ | —(CH₂)₃SO₃ | H |
| 6-19 | —CH₂)Ph(4-COOH) | H | H | CO₂Me | H | H | H |
| 6-20 | —CH₂)Ph(4-COOH) | H | H | CO₂Me | CH₃ | CH₃ | H |
| 6-21 | CH₃ | H | SO₃Na | H | CH₃ | H | H |

TABLE 7

[Structure diagram with substituents R¹-R⁸ on a benzothiazine-phenyl system]

| Dye | R¹ | R² | R³ | R⁴ | R⁵ | R⁶ | R⁷ | R⁸ | m |
|---|---|---|---|---|---|---|---|---|---|
| 7-1 | CH₃ | H | H | H | H | CH₃ | CH₃ | H | 0 |
| 7-2 | CH₃ | H | Cl | H | H | CH₃ | CH₃ | H | 0 |
| 7-3 | Ph | H | H | CH₃ | H | Et | Et | H | 0 |
| 7-4 | CH₂Ph | H | H | H | H | CH₃ | CH₃ | H | 0 |
| 7-5 | CH₃ | H | CO₂Me | H | H | Et | —(CH₂)Ph(4-COOH) | H | 0 |
| 7-6 | n-Bu | H | H | H | H | n-Pr | n-Pr | H | 1 |
| 7-7 | —(CH₂)₃SO₃K | H | H | H | H | CH₃ | CH₃ | H | 1 |
| 7-8 | —(CH₂)₃COOH | H | H | H | H | Et | Et | H | 1 |

TABLE 8

[Structure diagram with substituents R¹-R⁷ on a benzothiazine-phenyl system]

| Dye | R¹ | R² | R³ | R⁴ | R⁵ | R⁶ | R⁷ | m |
|---|---|---|---|---|---|---|---|---|
| 8-1 | —(CH₂)Ph(4-COOH) | H | CO₂Me | H | OMe | OMe | OMe | 0 |
| 8-2 | Et | H | COOH | H | Cl | OH | Cl | 0 |
| 8-3 | n-Bu | OMe | OMe | H | OMe | OMe | OMe | 1 |
| 8-4 | —(CH₂)₃COOH | H | COOH | H | H | OH | H | 0 |
| 8-5 | CH₃ | NHSO₂CH₃ | H | H | H | H | NHSO₂CH₃ | 0 |
| 8-6 | SO₂CH₃ | H | COOH | CH₃ | H | Cl | H | 0 |
| 8-7 | CH₃ | H | CO₂Me | H | H | COOH | OH | 0 |
| 8-8 | n-Bu | H | COOH | H | H | NO₂ | H | 1 |
| 8-9 | —(CH₂)₃SO₃K | H | COOK | H | H | SO₃K | H | 1 |
| 8-10 | —(CH₂)₃COOH | Cl | Cl | H | H | H | pyridyl | 0 |
| 8-11 | —(CH₂)Ph | H | COOH | H | H | OH | H | 0 |
| 8-12 | CH₃ | H | H | H | H | CONHSO₂CH₃ | H | 0 |
| 8-13 | COCH₃ | H | CO₂Me | H | H | NO₂ | H | 0 |
| 8-14 | H | H | H | H | H | CONHSO₂CH₃ | H | 0 |

TABLE 9

[Structure diagram with substituents R¹-R⁸ and Y on a benzothiazine-benzazole system]

| Dye | R¹ | R² | R³ | R⁴ | R⁵ | R⁶ | R⁸ | m | Y |
|---|---|---|---|---|---|---|---|---|---|
| 9-1 | —(CH₂)Ph(4-COOH) | H | CO₂Me | H | H | COOH | CH₃ | 0 | O |
| 9-2 | CH₃ | H | CO₂Me | H | H | COOH | CH₃ | 0 | O |
| 9-3 | n-Bu | H | COOH | H | H | COOH | CH₃ | 1 | O |
| 9-4 | —(CH₂)₃COOH | H | COOH | H | H | OH | CH₃ | 0 | O |
| 9-5 | CH₃ | NHSO₂CH₃ | H | H | H | NHSO₂CH₃ | CH₃ | 0 | O |
| 9-6 | n-Bu | H | COOH | H | H | COOH | CH₃ | 0 | O |
| 9-7 | CH₃ | H | CO₂Me | H | H | COOH | CH₃ | 1 | O |
| 9-8 | n-Bu | H | COOH | H | H | NO₂ | —(CH₂)₃SO₃K | 0 | O |

TABLE 9-continued

| Dye | $R^1$ | $R^2$ | $R^3$ | $R^4$ | $R^5$ | $R^6$ | $R^8$ | m | Y |
|---|---|---|---|---|---|---|---|---|---|
| 9-9 | —(CH$_2$)$_3$SO$_3$K | H | COOK | H | H | Ph | —(CH$_2$)$_3$SO$_3$K | 1 | O |
| 9-10 | —(CH$_2$)$_3$COOH | H | Cl | H | H | Cl | —(CH$_2$)$_3$SO$_3$K | 0 | O |
| 9-11 | —(CH$_2$)Ph | H | COONa | H | H | Cl | —(CH$_2$)$_3$SO$_3$Na | 0 | O |
| 9-12 | CH$_3$ | H | H | H | H | CONHSO$_2$CH$_3$ | CH$_3$ | 0 | O |
| 9-13 | COCH$_3$ | H | CO$_2$Me | H | H | NO$_2$ | Et | 0 | O |
| 9-14 | H | H | H | H | H | CONHSO$_2$CH$_3$ | CH$_3$ | 0 | O |
| 9-15 | CH$_3$ | H | CO$_2$Me | H | H | Ph | —(CH$_2$)$_3$SO$_3$Na | 1 | S |
| 9-16 | CH$_3$ | H | H | H | H | Ph | —(CH$_2$)$_3$SO$_3$Na | 1 | O |
| 9-17 | CH$_3$ | H | CO$_2$Me | H | H | Ph | —(CH$_2$)$_3$SO$_3$Na | 0 | S |

One method used to incorporate solvent or water-soluble filter dyes into photographic film element layers is to add them as aqueous or alcoholic isotropic solutions. Dyes introduced by this method are generally highly mobile and rapidly diffusing and often wander into other layers of the element, us with deleterious results. While the use of polymeric mordants can prevent dye wandering, such mordants aggravate the stain problem encountered when the dye remains in the element through processing. Filter dyes have also been prepared as conventional dispersions in aqueous gelatin using standard colloid milling or homogenization methods or as loaded latices. More recently, ball-milling, sand-milling, media-milling and related methods of producing fine-particle-size slurries and suspensions of solid filter dyes have become standard tools for producing slurries and dispersions that can readily be used in photographic melt formulations. Solid particle filter dyes introduced as dispersions, when coated at sufficiently low pH, can eliminate problems associated with dye wandering. In one embodiment the particles have a mean diameter from 0.01 to 100 micrometers. The dyes may be located in any layer of the element where it is desirable to absorb light, but in photographic elements it is particularly advantageous to locate them in a layer where they will be solubilized and washed out during processing. Useful amounts of dye range from 1 to 1000 mg/m$^2$. The dye should be present in an amount sufficient to yield an optical density at the absorbance Dmax in the spectral region of interest before processing of at least 0.10 density units and preferably at least 0.50 density units. This optical density will generally be less than 5.0 density units for most photographic applications.

The dyes of the invention can be used as interlayer dyes, trimmer dyes, antihalation dyes or light-absorbing elements. They can be used to prevent crossover in X-ray materials as disclosed in U.S. Pat. Nos. 4,900,652 and 4,803,150 and European Patent Application Publication No. 0 391 405, to prevent unwanted light from reaching a sensitive emulsion layer of a multicolor photographic element as disclosed in U.S. Pat. No. 4,988,611, and for other uses as indicated by the absorbance spectrum of the particular dye. The dyes can be used in a separate filter layer or as an intergrain absorber.

The dyes of Formula (II, IIA, III and IIIA) are useful for the preparation of radiation sensitive materials. Such materials are sensitive to radiation such as visible light, ultraviolet, infrared, or X-ray.

The dyes of Formula (II, IIA, III and IIIA) are also useful in non-photographic imaging elements such output materials for inkjet applications. The non-photographic imaging material may also be an optical recording medium, such as a CD or other medium sensitive to a laser, or light-emitting diode.

Another aspect of this invention comprises a radiation sensitive element containing a dye of Formula (II, IIA, III and IIIA). Preferably, the radiation sensitive element is a photographic element comprising a support bearing at least one light sensitive hydrophilic colloid layer (Generally this is a silver halide emulsion layer) and at least one other hydrophilic colloid layer. A dye of Formula (II, IIA, III and IIIA) may be incorporated in a hydrophilic layer of the photographic element in any known way.

The support of the element of the invention can be any of a number of well-known supports for photographic elements as discussed more fully below.

The photographic elements made by the method of the present invention can be single color elements or multicolor elements. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent or reflective (for example, a paper support).

Photographic elements of the present invention may also usefully include a magnetic recording material as described in *Research Disclosure*, Item 34390, November 1992, or a transparent magnetic recording layer such as a layer containing magnetic particles on the underside of a transparent support as in U.S. Pat. Nos. 4,279,945 and 4,302,523. The element typically will have a total thickness (excluding the support) of from 5 to 30 micrometers. While the order of the color sensitive layers can be varied, they will normally be red-sensitive, green-sensitive and blue-sensitive, in that order on a transparent support, (that is, blue sensitive furthest from the support) and the reverse order on a reflective support being typical.

The present invention also contemplates the use of photographic elements of the present invention in what are often referred to as single use cameras (or "film with lens" units). These cameras are sold with film preloaded in them and the entire camera is returned to a processor with the exposed film remaining inside the camera. Such cameras may have glass or plastic lenses through which the photographic element is exposed.

In the following discussion of suitable materials for use in elements of this invention, reference will be made to *Research Disclosure*, September 1996, Number 389, Item 38957, which will be identified hereafter by the term "Research Disclosure I." The Sections hereafter referred to are Sections of the Research Disclosure I unless otherwise indicated. All Research Disclosures referenced are published by Kenneth Mason Publications, Ltd., Dudley Annex, 12a North Street, Emsworth, Hampshire PO10 7DQ, ENGLAND. The foregoing references and all other references cited in this application are incorporated herein by reference.

The silver halide emulsions employed in the photographic elements of the present invention may be negative-working, such as surface-sensitive emulsions or unfogged internal latent image forming emulsions, or positive working emulsions of internal latent image forming emulsions (that are either fogged in the clement or fogged during processing). Suitable emulsions and their preparation as well as methods of chemical and spectral sensitization are described in Sections I through V. Color materials and development modifiers are described in Sections V through XX. Vehicles which can be used in the photographic elements are described in Section II, and various additives such as brighteners, antifoggants, stabilizers, light absorbing and scattering materials, hardeners, coating aids, plasticizers, lubricants and matting agents are described, for example, in Sections VI through XIII. Manufacturing methods are described in all of the sections, layer arrangements particularly in Section XI, exposure alternatives in Section XVI, and processing methods and agents in Sections XIX and XX.

With negative working silver halide a negative image can be formed. Optionally a positive (or reversal) image can be formed although a negative image is typically first formed.

The photographic elements of the present invention may also use colored couplers (e.g., to adjust levels of interlayer correction) and masking couplers such as those described in EP 213 490; Japanese Published Application 58-172,647; U.S. Pat. No. 2,983,608; German Application DE 2,706, 117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps of bleaching or fixing to improve the quality of the image. Bleach accelerators described in EP 193 389; EP 301 477; U.S. Pat. Nos. 4,163,669; 4,865,956; and U.S. Pat. No. 4,923,784 are particularly useful. Also contemplated is the use of nucleating agents, development accelerators or their precursors (UK Patent 2,097,140; U.K. Patent 2,131,188); electron transfer agents (U.S. Pat. Nos. 4,859,578; 4,912, 025); antifogging and anti color-mixing agents such as derivatives of hydroquinones, aminophenols, amines, gallic acid; catechol; ascorbic acid; hydrazides; sulfonamidophenols; and non color-forming couplers.

The elements may also contain filter dye layers comprising colloidal silver sol or yellow and/or magenta filter dyes and/or antihalation dyes (particularly in an undercoat beneath all light sensitive layers or in the side of the support opposite that on which all light sensitive layers are located) formulated either as oil-in-water dispersions, latex dispersions, solid particle dispersions, or as direct gelatin dispersions. Additionally, they may be used with "smearing" couplers (e.g., as described in U.S. Pat. No. 4,366,237; EP 096 570; U.S. Pat. No. 4,420,556, and U.S. Pat. No. 4,543, 323.) Also, the couplers may be blocked or coated in protected form as described, for example, in Japanese Application 61/258,249 or U.S. Pat. No. 5,019,492.

The photographic elements may further contain other image-modifying compounds such as "Developer Inhibitor-Releasing" compounds (DIR's). Useful additional DIR's for elements of the present invention, are known in the art and examples are described in U.S. Pat. Nos. 3,137,578; 3,148, 022; 3,148,062; 3,227,554; 3,384,657; 3,379,529; 3,615, 506; 3,617,291; 3,620,746; 3,701,783; 3,733,201; 4,049, 455; 4,095,984; 4,126,459; 4,149,886; 4,150,228; 4,211, 562; 4,248,962; 4,259,437; 4,362,878; 4,409,323; 4,477, 563; 4,782,012; 4,962,018; 4,500,634; 4,579,816; 4,607, 004; 4,618,571; 4,678,739; 4,746,600; 4,746,601; 4,791, 049; 4,857,447; 4,865,959; 4,880,342; 4,886,736; 4,937, 179; 4,946,767; 4,948,716; 4,952,485; 4,956,269; 4,959, 299; 4,966,835; 4,985,336 as well as in patent publications GB 1,560,240; GB 2,007,662; GB 2,032,914;: GB 2,099, 167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378,236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in Photographic Science and Engineering, Vol. 13, p. 174 (1969), incorporated herein by reference.

It is also contemplated that the concepts of the present invention may be employed to obtain reflection color prints as described in *Research Disclosure*, November 1979, Item 18716, available from Kenneth Mason Publications, Ltd, Dudley Annex, 12a North Street, Emsworth, N.H. PO10 7DQ, England, incorporated herein by reference. The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat. Nos. 4,346,165; 4,540,653 and 4,906, 559); with ballasted chelating agents such as those in U.S. Pat. No. 4,994,359, to reduce sensitivity to polyvalent cations such as calcium; and with stain reducing compounds such as described in U.S. Pat. Nos. 5,068,171 and 5,096,805. Other compounds useful in the elements of the invention are disclosed in Japanese Published Applications 83-09,959; 83-62,586; 90-072,629, 90-072,630; 90-072,632; 90-072, 633; 90-072,634; 90-077,822; 90-078,229; 90-078,230; 90-079,336; 90-079,338; 90-079,690; 90-079,691; 90-080, 487; 90-080,489; 90-080,490; 90-080,491; 90-080,492; 90-080,494; 90-085,928; 90-086,669; 90-086,670; 90-087, 361; 90-087,362; 90-087,363; 90-087,364; 90-088,096; 90-088,097; 90-093,662; 90-093,663; 90-093,664; 90-093, 665; 90-093,666; 90-093,668; 90-094,055; 90-094,056; 90-101,937; 90-103,409; 90-151,577.

The silver halide used in the photographic elements may be silver iodobromide, silver bromide, silver chloride, silver chlorobromide, silver chloroiodobromide, and the like. For example, the silver halide used in the photographic elements of the present invention may contain at least 90% silver chloride or more (for example, at least 95%, 98%, 99% or 100% silver chloride). In the case of such high chloride silver halide emulsions, some silver bromide may be present but typically substantially no silver iodide. Substantially no silver iodide means the iodide concentration would be no more than 1%, and preferably less than 0.5 or 0.1%. In particular, in such a case the possibility is also contemplated that the silver chloride could be treated with a bromide source to increase its sensitivity, although the bulk concentration of bromide in the resulting emulsion will typically be no more than about 2 to 2.5% and preferably between about 0.6 to 1.2% (the remainder being silver chloride). The foregoing % figures are mole %. In another embodiment the grain are silver iodobromide with no more than 10% iodide.

The type of silver halide grains preferably include polymorphic, tabular, cubic, and octahedral. The grain size of the silver halide may have any distribution known to be useful in photographic compositions, and may be either polydipersed or monodispersed.

Tabular grains are those with two parallel major faces each clearly larger than any remaining grain face and tabular grain emulsions are those in which the tabular grains account for at least 30 percent, more typically at least 50 percent, preferably >70 percent and optimally >90 percent of total grain projected area. The tabular grains can account for substantially all (>97 percent) of total grain projected area. The tabular grain emulsions can be high aspect ratio tabular grain emulsions—i.e., ECD/t >8, where ECD is the diameter of a circle having an area equal to grain projected area and t is tabular grain thickness; intermediate aspect ratio tabular grain emulsions—i.e., ECD/t =5 to 8; or low aspect ratio tabular grain emulsions—i.e., ECD/t =2 to 5. The emulsions typically exhibit high tabularity (T), where T (i.e., ECD/t2) >25 and ECD and t are both measured in micrometers (mm). The tabular grains can be of any thickness compatible with achieving an aim average aspect ratio and/or average tabularity of the tabular grain emul-sion. Preferably the tabular grains satisfying projected area requirements are those having thicknesses of <0.3 mm, thin (<0.2 mm) tabular grains being specifically preferred and ultra-thin (<0.07 mm) tabular grins being contemplated for maximum tabular grain performance enhancements. When the native blue absorption of iodohalide tabular grains is relied upon for blue speed, thicker tabular grains, typically up to 0.5 mm in thickness, are contemplated High iodide tabular grain emulsions are illustrated by House U.S. Pat. No. 4,490,458, Maskasky U.S. Pat. No. 4,459,353 and Yagi et al EPO 0 410 410.

Tabular grains formed of silver halide(s) that form a face centered cubic (rock salt type) crystal lattice structure can have either {100} or {111}major faces. Emulsions containing {111} major face tabular grains, including those with controlled grain dispersities, halide distributions, twin plane spacing, edge structures and grain dislocations as well as adsorbed {111} grain face stabilizers, are illustrated in those references cited in Research Disclosure I, Section I.B.(3) (page 503).

The silver halide grains to be used in the invention may be prepared according to methods known in the art, such as those described in Research Disclosure I and James, *The Theory of the Photographic Process*. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with noble metal (for example, gold) sensitizers, middle chalcogen (for example, sulfur) sensitizers, reduction sensitizers and others known in the art. Compounds and techniques useful for chemical sensitization of silver halide are known in the art and described in Research Disclosure I and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in Research Disclosure I. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in Research Disclosure I. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30 to 80° C., as described in Research Disclosure I, Section IV (pages 510–511) and the references cited therein.

The silver halide may be sensitized by sensitizing dyes by any method known in the art, such as described in Research Disclosure I. The dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol. The dye/silver halide emulsion may be mixed with a dispersion of color image-forming coupler immediately before coating or in advance of coating (for example, 2 hours).

Photographic elements of the present invention are preferably imagewise exposed using any of the known techniques, including those described in Research Disclosure I, section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like).

Photographic elements comprising the composition of the invention can be processed in any of a number of well-known photographic processes utilizing any of a number of well-known processing compositions, described, for example, in Research Disclosure I, or in T. H. James, editor, *The Theory of the Photographic Process*, 4th Edition, Macmillan, N.Y., 1977. In the case of processing a negative working element, the element is treated with a color developer (that is, one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Especially preferred are:

- 4-amino N,N-diethylaniline hydrochloride,
- 4-amino3-methyl-N,N-diethylaniline hydrochloride,
- 4-amino-3-methyl-N-ethyl-N-(b-(methanesulfonamido) ethylaniline sesquisulfate hydrate,
- 4-amino-3-methyl-N-ethyl-N-(b-hydroxyethyl)aniline sulfate,
- 4-amino-3-β-(methanesulfonamido)ethyl-N,N-diethylaniline hydrochloride and
- 4-amino-N-ethyl-N-(2-methoxyethyl)m-toluidine di-p-toluene sulfonic acid.

Development is followed by bleach-fixing, to remove silver or silver halide, washing and drying.

The following examples illustrate the practice of this invention. They are not intended to be exhaustive of all possible variations of the invention. Parts and percentages are by weight unless otherwise indicated.

EXAMPLES

Example 1

A general synthesis of the 3,4-dihydro-1H-2,1-benzothiazin-4-one nucleus has been published (Lombardino et. al, Org. Prep. Proc. Int. 1971, 3(1), 33) and (U.S. Pat. No. 3,303,191). The dyes of Formulae II, IIA, III and IIIA can be prepared by synthetic techniques well known in the art, as illustrated by the synthetic examples below. Such techniques are further illustrated, for example, in "The Cyanine Dyes and Related Compounds", Frances Hamer, Interscience Publishers, 1964.

Synthesis of Dye 1-11

Under nitrogen, triethylamine (1.409 grams, 0.0139 mol) was slowly added to a stirring slurry of 3,4-dihydro-1-ethyl-2,1-benzothiazin4-one 2,2-dioxide-7-carboxylic acid (3.00 grams, 0.0111 mol) and glutacondialdehydedianil hydrochloride salt (1.59 grams, 0.0056 mol), in 30 ml absolute ethanol. The solution turned blue instantaneously upon the addition of triethylamine. The reaction was then monitored by HPLC and allowed to proceed at room temperature until completion. The slurry was added slowly, at 0° C., to 300 ml of a stirring and dilute 10% v/v acetic acid solution, resulting in the precipitation of dye material. The crude dye material was collected by filtration and washed repeatedly with 150 ml of dilute acetic acid and 150 ml P-950 ligroin. Vacuum drying afforded 3.086 grams (92% yield) pure dye material. All analytical data were consistent with the structure.

Synthesis of Dye 2-5

Under nitrogen, triethylamine (1.486 grams, 0.0147 mol) was slowly added to a stirring slurry of 3,4-dihydro-1-methyl-2,1-benzothiazin-4-one 2,2-dioxide-7-carboxylic acid (3.00 grams, 0.0117 mol) and cyclohexenylidenepelargondialdehydedianil hydrochoride salt (2.22 grams., 0.0059 mol), in 30 ml absolute ethanol. The solution turned dark instantaneously upon the addition of triethylamine. The reaction was then monitored by HPLC and allowed to proceed at room temperature until completion. The slurry was added slowly, at 0° C., to 300 ml of a stirring and dilute 10% v/v acetic acid solution, resulting in the precipitation of dye material. The crude dye material was collected by filtration and washed repeatedly with 150 ml of dilute acetic acid and 150 ml P-950 ligroin. Vacuum drying afforded 3.843 grams (98% yield) pure dye material. All analytical data were consistent with the structure.

Synthesis of 7-carboxy, 3,4-dihydro-1H-2,1-benzothiazin-4-one 2,2-dioxide

Sodium carbonate (2.2 g, 0.021 mol)was added to a mixture of 5 g (0.017 mol) of dimethyl (methanesulfonamido)terephthalate in 40 ml N-methyl pyrrolidinone at 25 C. Methyl p-toluenesulfonate (3.9 g, 0.021 mol) was then added, and the reaction was heated at 120 C. for 60 min, then cooled to 25 C. Sodium methoxide (0.037 mol) was added dropwise at 25 C. as a 25% wt/wt solution in methanol. After 60 min, 10 ml of water was added. The reaction stirred at 25 C. for 30 min, then the pH of the solution was adjusted to 4 by slow addition of concentrated HCl solution. A precipitate formed, and the solid was collected by filtration and rinsed with water, then dried in a vacuum oven. Yield 4.3 g (87% over 3 steps); >97% pure by HPLC.

This method, especially the alkylation step, is a significant improvement over preparations cited in the literature. It is general for placing many different alkyl or aralkyl substituents on the sulfonamide nitrogen. The alkylation/ring closure reaction series can be carried out in one pot as described above, or as separate reactions. The best results for the sulfonamide alkylation are obtained using a weak base, in which the pKa of the conjugate acid is less than 15, and most preferably a buffered system using carbonate or bicarbonate bases in dry solvent. The solvent is preferably 1-Methyl-2-pyrrolidinone or a similar nitrogen-containing solvent that can be alkylated during the reaction. These solvents are superior to dimethylformamnide, or alcoholic solvents. The alkylation reaction is carried out preferably between 25–150 C., most preferably between 80–130 C. The alkylation agent is preferably a milder variety such as methyl p-toluensulfonate which is superior to more active alkylating agents such as, methyl iodide or dimethylsulfate. The relative reactivities of common alkylating agents follow the approximate order R-CI<RO-SO$_2$-C$_6$H$_4$CH$_3$-p<R-Br<R-I<R-O-SO$_2$-O-R. Methyl brosylates, tosylates and nosylates are also preferred reagents for these sulfonamide alkylations. (RefHouse, H. O., "Modem Synthetic Reactions", 1972, p.532.)

TABLE 10

Solution Absorbance Maxima of Representative Examples of Benzothiazine Polymethine Dyes

| Dye No. | λmax (nm) | εmax (×10$^4$) | Solvent |
| --- | --- | --- | --- |
| 1-1 | 656 | 8.47 | MeCN |
| 1-2 | 670 | 8.06 | MeCN |
| 1-5 | 636 | 9.53 | MeCN |
| 1-6 | 663 | 4.27 | MeCN |
| 1-9 | 632 | 7.30 | MeCN |
| 1-11 | 640 | 6.10 | MeCN |
| 1-27 | 650 | 16.0 | MeCN |
| 2-1 | 767 | 9.42 | MeCN |
| 2-5 | 759 | 9.68 | MeCN |
| 2-8 | 755 | 11.48 | MeCN |
| 2-9 | 768 | 13.19 | MeCN |
| 3-11 | 554 | 8.90 | MeCN + TEA |
| 4-9 | 457 | 2.86 | MeOH |
| 5-1 | 485 | 4.35 | MeOH + TEA |
| 5-2 | 507 | 5.11 | MeOH + TEA |
| 5-3 | 485 | 4.42 | MeOH + TEA |
| 5-4 | 507 | 5.39 | MeOH + TEA |
| 5-5 | 485 | 4.52 | MeOH + TEA |
| 5-6 | 507 | 5.29 | MeCN |
| 5-7 | 485 | 4.44 | MeOH + TEA |
| 5-8 | 507 | 5.23 | MeCN |
| 6-9 | 432 | 3.21 | MeOH |
| 6-11 | 428 | 3.07 | MeOH + TEA |
| 9-2 | 468 | 4.63 | MeOH |

Example 2

Fluorescence Characteristics of Benzothiazine Pentamethine Oxonol Dyes

Solutions of dyes 1-1, 1-6 and Comparative Dyes A and B were each prepared in MeOH at a concentration of approximately 0.005 g/L. The solution absorbance maxima were measured, and the extinction coefficients calculated. Each MeOH solution was diluted ten-fold with MeOH to produce dye solutions at a concentration of approximately 0.0005 g/L, and the fluorescence of these solutions were measured with a fluorimeter (scan speed 60 nm/min; slit width 4.5 nm). In each case, the excitation wavelength was identical with the λmax for each dye. The resulting emission characteristics (Primary Fluorescence Emission Maxima and Primary Fluorescence Intensity Maxima) were measured. The results appear in Table 11.

(bis(vinylsulfonylmethyl)ether) were added to the dye-gelatin melt prepared as described above. A melt from this mixture was then coated on a poly(ethylene terephthalate) support to achieve a dye coverage of 0.27 $g/m^2$, a gelatin coverage of 1.61 $g/m^2$, a spreading agent level of 0.097 $g/m^2$, and a hardener level of 0.016 $g/m^2$. The absorbance of the dye dispersion was measured with a spectrophotometer. Identical elements were subjected to a 5 minute distilled water wash (2–3 gal/min flow rate), incubation at 120F/50% relative humidity (RH) for 1 week, and to Kodak E-6 Processing (which is described in British Journal of Pho-

TABLE 11

Comparative Dyes

Comparative Dye A

Comparative Dye B

| Dye | λmax (nm) | εmax (× 10⁴) | Primary Fluorescence Emission Max | Primary Fluorescence Intensity Max |
|---|---|---|---|---|
| 1-1 | 650 | 6.3 | 675 mm | 8.3 |
| 1-6 | 663 | 2.9 | 699 mm | 0.1 |
| Comp A | 587 | 16.6 | 613 mm | 462.0 |

The results above clearly show that the inventive pentamethine oxonol dyes are extremely low in solution fluorescence as compared with comparative pentamethine oxonol dyes A and B known in the art. It is highly desirable in photographic systems to use filter dyes with little or no solution fluorescence, so as to avoid unwanted false sensitization of the sensitized silver halide element, and to allow for effective light management.

Example 3
Dye Wandering and Stain Evaluation

Dyes according to formulae (II) and (III) were prepared as solid particle dispersions by ball-milling according to the following procedure. Water (21.7 ml) and a 6.7% solution of Triton X-200™ surfactant (2.65 g) were placed in a 60 ml screw-capped bottle. A 1.00 g sample of dye was added to this solution. Zirconium oxide beads (40 ml, 2 mm diameter) were added and the container with the cap tightly secured was placed in a mill and the contents milled for four days. The container was removed and the contents added to a 12.5% aqueous gelatin (8.0 g) solution. The new mixture was placed on a roller mill for 10 minutes, and the resulting mixture was filtered to remove the zirconium oxide beads. The resulting dye dispersion had a particle size mean diameter lees than 1.0 μm.

The solid particle dispersions of these dyes were coated on a polyester support according to the following procedure. A spreading agents. (surfactant 10G™, and a hardener tography Annual, 1977, pp. 194–97) and the absorbance was measured for each. The results are shown in Table. 12.

TABLE 12

Data for Representative Examples of Benzothiazine Polymethine Dyes Formulated as Solid Particle Dispersions

| Dye No. | λmax (nm) | Dmax | Dmax after water wash | Dmax after 1 week @ 120F/50%RH | Dmax after E6 processing |
|---|---|---|---|---|---|
| 1-27 | 638 | 1.41 | 1.26 | 1.39 | 0.01 |
| 6-11 | 452 | 1.00 | 1.00 | 1.00 | 0.01 |
| 9-2 | 458 | 1.43 | 1.45 | 1.43 | 0.01 |
| 5-2 | 600 | 1.85 | 1.73 | 1.84 | 0.01 |
| 5-1 | 543 | 1.70 | 1.61 | 1.54 | 0.01 |
| 5-7 | 543 | 0.76 | 0.76 | 0.73 | 0.00 |
| 5-5 | 546 | 1.12 | 1.12 | 1.07 | 0.01 |
| 5-3 | 578 | 1.30 | 1.28 | 1.25 | 0.00 |
| 5-6 | 573 | 1.32 | 1.32 | 1.27 | 0.01 |
| 5-4 | 590 | 1.39 | 1.27 | 1.32 | 0.01 |
| 5-8 | 475 | 0.73 | 0.66 | 0.79 | 0.01 |

These results show that the dyes of the present invention are largely unaffected by the water wash or high heat and humidity conditions indicating little or no wandering at coating pH and excellent robustness under extreme keeping conditions. The inventive dyes, however, are fully solubilized for removal and/or decolorization during photographic processing and leave no post-process stain.

The invention has been described in detail with particular reference to certain preferred embodiments thereof, but it will be understood that variations and modifications can be effected within the spirit and scope of the invention.

What is claimed is:

1. A dye represented by Formulae II and IIA below:

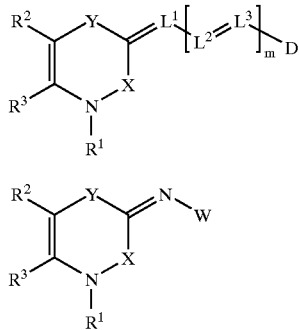

wherein;

$R^1$ represents a hydrogen, an aryl group containing 6 to 14 carbon atoms, or an alkyl group containing 1 to 12 carbon atoms;

$R^2$ and $R^3$ together form an aromatic, carbocyclic or heterocyclic ring system containing 6 to 14 atoms;

"X represents a sulfone ($SO_2$) group;"

"Y represents a carbonyl (C=O) group; (C(CN)$_2$) group;

$L^1$, $L^2$, and $L^3$ represent methine groups, wherein the methine groups may be members of a 5 or 6-membered ring when m is equal to or >1 m is 0, 1, 2, or 3;

W is an aryl group; and

D is a moiety in conjugation with the X and Y groups, with the proviso that D is not a hemicyanine moiety.

2. The dye of claim 1 wherein $R^2$ and $R^3$ together form a benzene ring.

3. The dye of claim 1 wherein D is a group containing a benzene ring or D contains an atom with an available electron pair positioned in conjugation with the X and Y groups, said atom being an O, N, Se, S or C with at least one electron-withdrawing group bonded thereto.

4. The dye of claim 1 wherein D is represented by the following formulae:

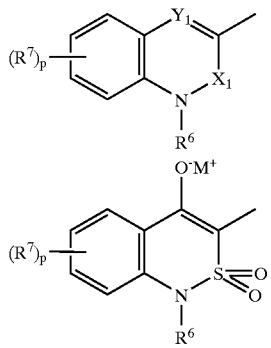

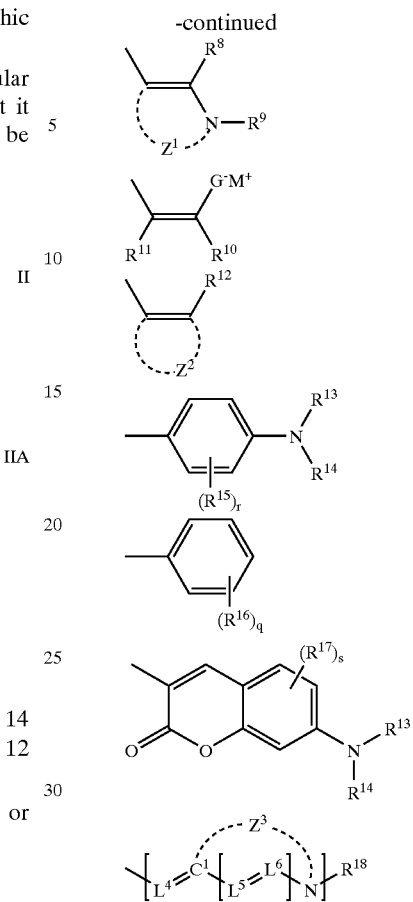

wherein

"$X_1$ represents a sulfone ($SO_2$) group;"

"$Y_1$ represents a carbonyl (C=O) group; (C(CN)$_2$) group;

$R^6$ is an aryl group or an alkyl group;

$R^7$ is independently a hydrogen or an alkyl group of 1 to 20 carbon atoms, an alkenyl group of 2 to 20 carbon atoms, an aryl, arylalkyl, heterocyclic or cycloalkyl group of 5 to 14 carbon atoms, or a hydroxy, carboxy, cyano, chloro, or nitro group;

$R^8$ is a hydrogen, or a carboxy, carboxyalkyl, sulfonamido, sulfamoyl, alkyl, arylalkyl, cycloalkyl, alkoxy, alkylamino, or alkylthio group;

$R^9$ is an alkyl group or an arylalkyl or cycloalkyl group;

$R^{10}$ is an alkyl group of 1 to 20 carbon atoms, an alkenyl group of 2 to 20 carbon atoms, or an aryl, aralkyl, heterocyclic or cycloalkyl group of 5 to 14 carbon atoms, and $R^{11}$ represents an electron withdrawing group, or $R^{10}$ and $R^{11}$ may together represent the non-metallic atoms necessary to complete a substituted or unsubstituted ring containing at least one 5- or 6-membered heterocyclic or unsaturated alicyclic nucleus;

$R^{12}$, $R^{15}$, $R^{16}$ and $R^{17}$ each individually represents a hydrogen, or a carboxy, carboxyalkyl, sulfonamido, sulfamoyl, alkyl, arylalkyl, cycloalkyl, alkoxy, alkylamino, or alkylthio;

$R^{13}$ and $R^{14}$ independently are an alkyl, alkenyl, aryl, arylalkyl, heterocyclic or cycloalkyl group, or $R^{13}$ and $R^{14}$ together represent the non-metallic atoms required to form a substituted or unsubstituted 5- or 6-membered ring with each other, or $R^{13}$ and $R^{14}$ individually represent the non-metallic atoms necessary to form a substituted or unsubstituted 5- or 6-membered fused ring with the phenyl ring to which the nitrogen is attached;

$R^{18}$ is an alkyl, arylalkyl or cycloalkyl group;

$Z^1$, $Z^2$ and $Z^3$ each individually represents the non-metallic atoms necessary to complete a substituted or unsubstituted ring system containing at least one 5- or 6-membered heterocyclic nucleus;

G is —O or —C(CN)$_2$;

$L^4$, $L^5$, and $L^6$ represent methine groups, wherein the methine groups may be members of a 5- or 6-membered ring when m is equal to or >1;

$M^+$ is a cation;

p is 0, 1, 2, 3, or 4;

q is 0, 1, 2, 3, 4, or 5;

r is 0, 1, 2, 3 or 4;

s is 0, 1, 2, or 3; and t is 0 or 1.

5. The dye of claim 1 wherein the dye is represented by Formula II.

6. The dye of claim 1 wherein the dye is represented by Formula IIA.

7. A dye represented by Formulae III or IIIA below:

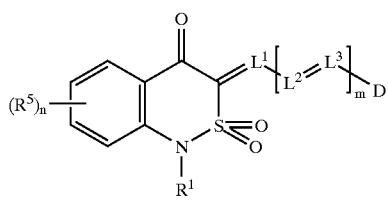

III

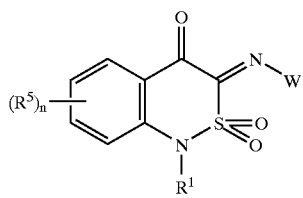

IIIA wherein;

$R^4$ represents a hydrogen, an aryl group containing 6 to 14 carbon atoms, or an alkyl group containing 1 to 12 carbon atoms;

$R^5$ is a substituent;

n is 0, 1, 2, 3, or 4;

$L^1$, $L^2$, and $L^3$ represent methine groups, wherein the methine groups may be members of a 5- or 6-membered ring when m is equal to or >1;

m is 0, 1, 2, or 3;

W is an aryl group; and

"D is a moiety in conjugation with the carbonyl oxygen of the benzothiazine ring with the proviso that D is not hemicyanine moiety."

8. The dye of claim 7 wherein $R^5$ is independently a hydrogen, or an alkyl group of 1 to 20 carbon atoms, an alkenyl group of 2 to 20 carbon atoms, an aryl, aralkyl, heterocyclic or cycloalkyl group of 5 to 14 carbon atoms, or a hydroxy, alkoxy, carboxy, alkoxycarbonyl, amido, cyano, halogen, or nitro group.

9. The dye of claim 7 wherein D is a group containing a benzene ring or D contains an atom with an available electron pair positioned in conjugation with the carbonyl oxygen of the benzothiazine ring, said atom being an O, N, Se, S or C with at least one electron-withdrawing group bonded thereto.

10. The dye of claim 7 wherein D is represented by the following formulae:

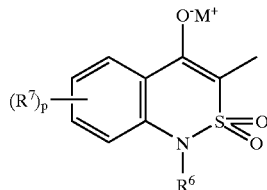

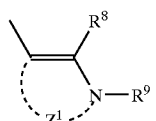

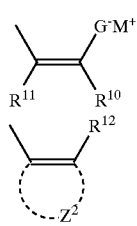

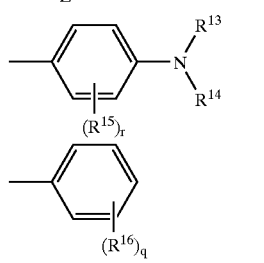

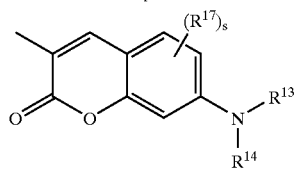

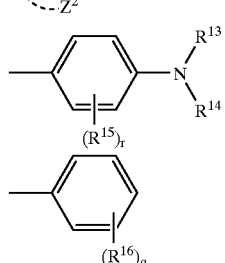

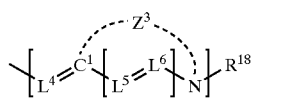

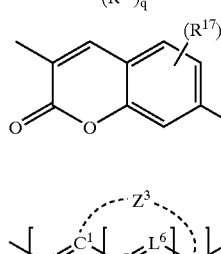

wherein $R^6$ is an aryl group or an alkyl group;

$R^7$ is independently a hydrogen or an alkyl group of 1 to 20 carbon atoms, an alkenyl group of 2 to 20 carbon atoms, an aryl, arylalkyl, heterocyclic or cycloalkyl group of 5 to 14 carbon atoms, or a hydroxy, carboxy, cyano, chloro, or nitro group;

$R^8$ is a hydrogen, or a carboxy, carboxyalkyl, sulfonamido, sulfamoyl, alkyl, arylalkyl, cycloalkyl, alkoxy, alkylamino, or alkylthio group;

$R^9$ is an alkyl group or an arylalkyl or cycloalkyl group;

$R^{10}$ is an alkyl group of 1 to 20 carbon atoms, an alkenyl group of 2 to 20 carbon atoms, or an aryl, aralkyl, heterocyclic or cycloalkyl group of 5 to 14 carbon atoms, and $R^{11}$ represents an electron withdrawing group, or $R^{10}$ and $R^{11}$ may together represent the non-metallic atoms necessary to complete a substituted or unsubstituted ring containing at least one 5- or 6-membered heterocyclic or unsaturated alicyclic nucleus;

$R^{12}$, $R^{15}$, $R^{16}$ and $R^{17}$ each individually represents a hydrogen, or a carboxy, carboxyalkyl, sulfonamido, sulfamoyl, alkyl, arylalkyl, cycloalkyl, alkoxy, alkylamino, or alkylthio;

$R^{13}$ and $R^{14}$ independently are an alkyl, alkenyl, aryl, arylalkyl, heterocyclic or cycloalkyl group, or $R^{13}$ and $R^{14}$ together represent the non-metallic atoms required to form a substituted or unsubstituted 5- or 6-membered ring with each other, or $R^{13}$ and $R^{14}$ individually represents the non-metallic atoms necessary to form a substituted or unsubstituted 5- or 6-membered fused ring with the phenyl ring to which the nitrogen is attached;

$R^{18}$ is an alkyl, arylalkyl or cycloalkyl group;

$Z^1$, $Z^2$ and $Z^3$ each individually represents the non-metallic atoms necessary to complete a substituted or unsubstituted ring system containing at least one 5-or 6-membered heterocyclic nucleus;

G is —O or —C(CN)$_2$;

$L^4$, $L^5$, and $L^6$ represent methine groups, wherein the methine groups may be members of a 5- or 6-membered ring when m is equal to or >1;

$M^+$ is a cation;

p is 0, 1, 2, 3, or 4;

q is 0, 1, 2, 3, 4, or 5;

r is 0, 1, 2, 3 or 4;

s is 0, 1, 2, or 3; and t is 0 or 1.

11. The dye of claim 7 wherein the dye is represented by Formula III.

12. The dye of claim 7 wherein the dye is represented by Formula IIIA.

* * * * *